United States Patent [19]
Sugimoto et al.

[11] 3,990,916
[45] Nov. 9, 1976

[54] SILVER OXIDE CELL

[75] Inventors: Kouichi Sugimoto, Sagamihara; Tsugio Sakai, Tokyo, both of Japan

[73] Assignee: Kabushiki Kaisha Daini Seikosha, Japan

[22] Filed: Dec. 26, 1974

[21] Appl. No.: 536,400

[30] Foreign Application Priority Data
Dec. 28, 1973 Japan .................................. 49-893
Dec. 28, 1973 Japan .................................. 49-911

[52] U.S. Cl. ............................... 429/142; 429/206; 429/219
[51] Int. Cl.² ............................................ H01M 6/06
[58] Field of Search ............ 136/111, 107, 20, 83 R

[56] References Cited
UNITED STATES PATENTS

| | | | |
|---|---|---|---|
| 2,829,186 | 4/1958 | Kort | 136/83 R |
| 3,245,837 | 4/1966 | Ikeda et al. | 136/28 X |
| 3,442,709 | 5/1969 | Hayase | 136/111 X |
| 3,485,672 | 12/1969 | Ruben | 136/111 |
| 3,496,018 | 2/1970 | Hamlen et al. | 136/120 FC |
| 3,530,496 | 9/1970 | Amano et al. | 136/107 X |
| 3,615,859 | 10/1971 | Schumm, Jr. | 136/107 |
| 3,634,142 | 1/1972 | Eaton | 136/111 |
| 3,655,450 | 4/1972 | Soto-Krebs | 136/107 |

*Primary Examiner*—John H. Mack
*Assistant Examiner*—C. F. Lefevour
*Attorney, Agent, or Firm*—Robert E. Burns; Emmanuel J. Lobato; Bruce L. Adams

[57] ABSTRACT

Disclosed is a divalent silver oxide cell having amorphous carbon and a current collector in the positive active material. Amorphous carbon is useful for quickly dropping the high voltage of the AgO which appears at the initiation of discharge to a lower constant voltage level. The current collector which is disposed in the positive active material reduces the internal resistance of the cell when operating at low ambient temperatures including room temperature.

7 Claims, 8 Drawing Figures

SILVER OXIDE CELL

FIELD OF THE INVENTION

This invention relates to a divalent silver oxide cell, and more particularly relates to a cell having a large discharge capacity with low internal resistance at lower temperatures including room temperature.

Silver oxide cells using monovalent silver oxide ($Ag_2O$) as the positive active material have been used, but their discharge capacity is insufficient so that the $Ag_2O$ is preferably replaced by AgO.

However, since the cell using divalent silver oxide has a chemical sequence of $AgO \rightarrow Ag_2O \rightarrow Ag$, two different voltage levels are observed during discharge. At the beginning of discharge, the voltage level of the AgO (1.8V) is evident, and after continuing at this voltage level for a little while, the voltage level of $Ag_2O$ (1.5V) takes over and is continued until discharge is completed and the voltage level of the cell falls to the zero level of Ag. This variable voltage level is the reason why the commercial use of this cell is limited.

There have been some attempts to eliminate this defect. Several are disclosed in U.S. Pat. Nos. 3,476,610 and 3,655,450. They are intended to operate at the lower initial potential level of $Ag_2O$ and to thus continue the constant voltage level of the $Ag_2O$ for a long time. But such cells have high cost due to the difficulty in manufacture and the reduced discharge capacity more or less equal to the quantity of inserted $Ag_2O$.

Further an improved silver oxide cell wherein the positive active material is composed of a mixture of divalent silver oxide and amorphous carbon was disclosed in assignee's copending application Ser. No. (504,822), filed Sept. 10, 1974. However, in this cell using such a positive active composition the internal resistance of the cell at lower temperatures is unsatisfactorily high. That is 20–30Ω at the room temperature and is 500Ω – 1KΩ at temperatures of −20° C respectively. Further, since electrolyte in the cell diffuses into the positive active material and the positive material becomes swollen during storage, the internal resistance of the cell gradually increases.

SUMMARY OF THE INVENTION

It is the object of the invention to provide a novel divalent silver oxide cell which does not exhibit two step voltage change and thus has a substantially constant discharge voltage.

Another object of the invention is to provide a longlife silver oxide cell.

Another object of the invention is to provide a silver oxide cell having diminished internal resistance at low temperatures up to and including room temperature.

Further objects of this invention are to provide a silver oxide cell, wherein the swelling of the positive active material, causing increased internal resistance after storage, is prevented.

According to this invention, the positive active material is comprised of a divalent silver oxide and amorphous carbon composition. As a result of the amorphous carbon in this composition, the high voltage, which appears at the beginning of discharge, is instantaneously dropped to a constant voltage level but the discharge capacity of the cell is increased based upon the capacity of the divalent silver rather than the normal monovalent silver.

A current collector made of an alkali-resistant material is inserted into the positive active material. As a result of the current collector, the internal resistance of the cell is significantly reduced at low temperatures including room temperature. Further, as a result of this current collector there results an improved electrical contact between positive active material and the electrolyte-saturated separater layer. In addition the swelling of positive active material upon storage is prevented or reduced by the resilience of a current collector and its electrical conductivity, is maintained.

The foregoing object and other objects as well as the characteristic features of the invention will become more apparent and more readily understandable by the following description and the appended claims when read in conjunction with the accompanying drawings.

DETAILED DESCRIPTION OF THE INVENTION

Figure 1:
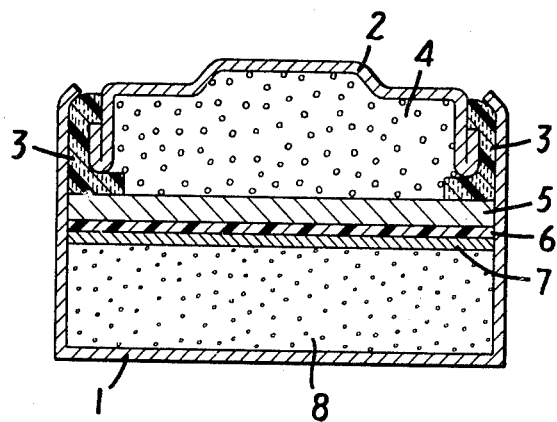
FIG. 1 shows the cross-sectional view of the first embodiment of this invention.

The invention will first be explained by reference to FIG. 1. The cathode can 1 and an anode can 2 are enclosed and sealed by packing 3 therebetween. Amalgamated negative active material 4 in which ten weight percent of mercury is added to powdered zinc or powdered cadmium, is provided in anode can 2. An electrolyte absorbent layer 5 and separator layer 6, made of cellophane, comprise the separator means.

The electrolyte in absorbent layer 5, is an aqueous solution 30–40 weight percent sodium hydroxide or 30–40 weight percent potassium hydroxide, both saturated with zinc oxide. A current collector 7, made of an alkali resistant metal net, such as stainless steel or nickel is disposed under separator means 5 and 6.

Positive active material 8 which comprises a mixture of divalent silver oxide powder and amorphous carbon powder is sealed under said current collector 7. Current collector 7 is thus disposed at the negative side of positive active material 8. And said collector 7 is in electro-conductive contact with the positive active material.

Preferably current collector net 7 is about 200 mesh. A current collector may be similarly positioned together with the positive active material 8.

The amorphous carbon which is used in this invention is the non-crystalline carbon such as charcoal, activated carbon, carbon black, cokes and so on. The optimum quantity of amorphous carbon which is added to the divalent silver oxide is less than 20 weight percent more than of the quantity of divalent silver oxide.

Figure 2:
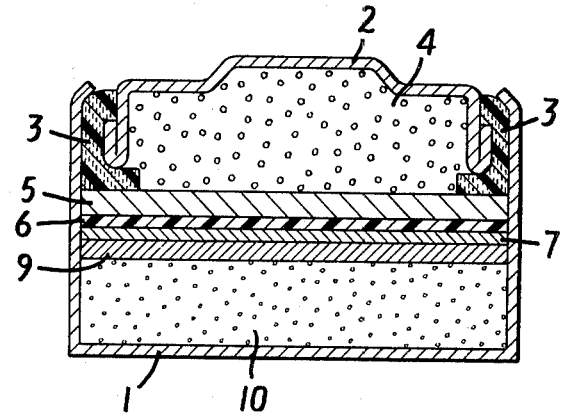
FIG. 2 shows the cross-sectional view of a second embodiment of this invention.

FIG. 2 shows the second embodiment of this invention wherein the same reference numerals indicate same parts. In this embodiment, the positive active material is differently arranged and is divided into two parts. There is a layer of amorphous carbon 9 which is disposed directly under the current collector 7 and between the layer of powdered divalent silver oxide 10. In this case, the current collector 7 is also positioned at the side of the negative pole.

Figure 3:
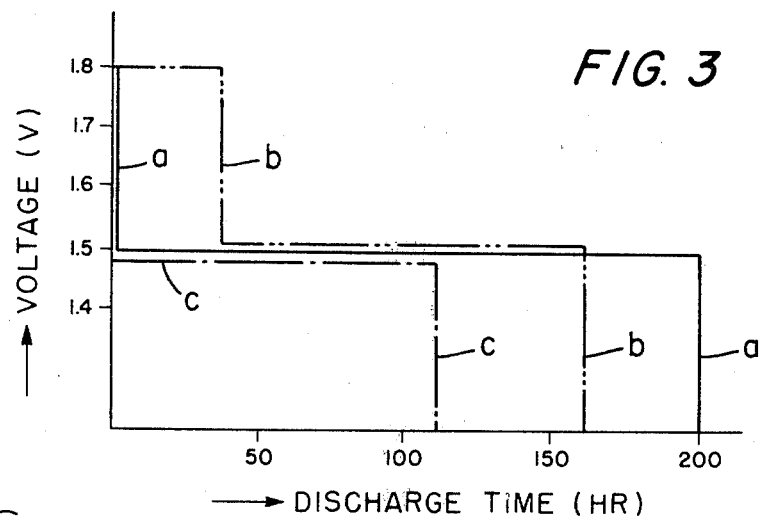
FIG. 3 shows the discharge curves of a conventional cell and a cell according to this invention.

FIG. 3 shows the continuous discharge characteristics of the cell according to this invention using a load resistance of 1.5 KΩ. The curve a shows a discharge curve of a divalent silver oxide cell according to this invention. It is seen that the discharge capacity of the cell according to this invention is greater than that of conventional monovalent silver oxide cell (curve c) and a conventional divalent silver oxide cell (curve b).

Notwithstanding an initial voltage of 1.8V, according to this invention, the voltage drops to the constant voltage of 1.5–1.6V as soon as discharge begins (within about one second) and it continues at that level for a fairly long time.

In FIG. 3, the abscissa shows discharge time (hours), and the ordinate shows voltage (V) of the cell.

Figure 4:
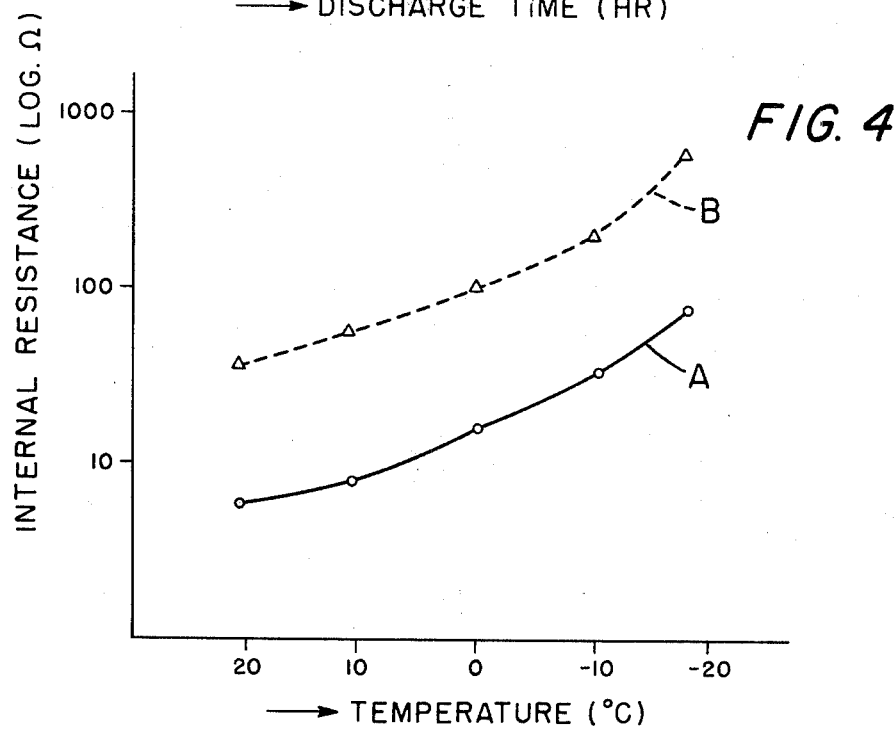
FIG. 4 shows change of internal resistance in these cells in response with changes of temperature.

FIG. 4 shows the change of internal resistance in accordance with changes of temperature. The curve A is the characteristics of the cells with the current collector but in which positive material is made of divalent silver oxide and amorphous carbon.

The curve B shows the characteristics of the conventional type cell without a current collector.

In this figure, the abscissa shows temperature (° C), and the ordinate shows internal resistance (log. Ω) of the cells. As is seen in this figure, the change of the internal resistance of the cell of this invention, with the change of temperature is much smaller than that of the cell without the current collector.

Figure 5:
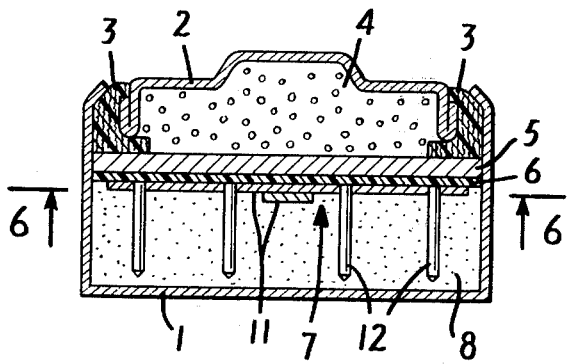
FIG. 5 shows the cross-sectional view of a third embodiment of this invention.
Figure 6:
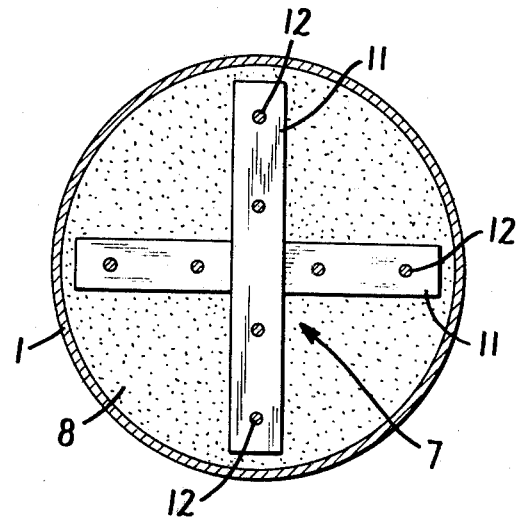
FIG. 6 shows a plane view of the current collector which is shown in FIG. 5.

FIGS. 5 and 6 show the third embodiment of this invention wherein the same reference numerals indicate the same elements as in the foregoing embodiments.

This current collector 7 is slightly modified from that of the foregoing embodiments. It is made by a pair of conductive cross plates 11 having a plurality of conductive poins 12. This current collector 7 is also made of an alkali resistant and conductive material, for example stainless steel or nickel, or monel or inconel and is inserted into the positive active material 8.

Figure 7:
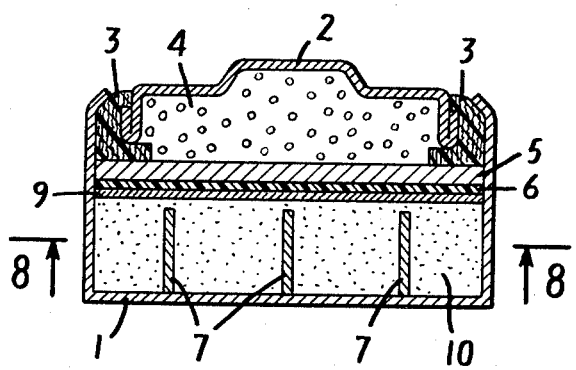
FIG. 7 shows the cross-sectional view of a fourth embodiment of this invention.
Figure 8:
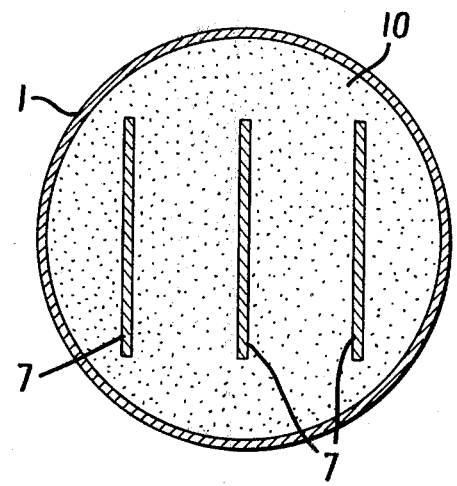
FIG. 8 shows a plane view of the current collector which is shown in FIG. 7.

FIGS. 7 and 8 are the fourth embodiment of the invention and the same reference numerals indicate the same elements as in the foregoing embodiments. In this embodiment, the positive active material is divided into two parts as in the case of the second embodiment.

They are a layer of amorphous carbon 9 which is disposed under the separation layer 6 and the layer of powdered divalent silver oxide 10. Of course, positive active material may be made in the same way as the case of the first and the second embodiments.

Furthermore, current collectors are a plurality conductive plates 7 which extend from the bottom of the cathode can 1 and are inserted and penetrate into the positive active material 10.

The continuous discharge characteristics of the cells according to the third and fourth embodiments using a load resistance of 1.5 KΩ are the same as curve a shown in FIG. 3.

The change of internal resistance in accordance with changes of temperatures in these cases is substantially the same as curve A shown in FIG. 4.

While preferred embodiments of the invention have been shown and described it will be understood that many modifications and changes can be made within the spirit and scope of the invention.

We claim:

1. A silver oxide cell of substantially constant discharge voltage comprising, negative active material of amalgamated zinc, an alkaline electrolyte, a body of positive-active material comprising divalent silver oxide and amorphous activated carbon, separator means intervening between said negative active material and said positive active material and comprising an alkaline electrolyte-absorbant layer and a semipermeable cellophane layer, and an alkali-resistant electrolyte-inert metallic current collector which is inserted within and in electroconductive contact with said body of positive-active material.

2. The silver oxide cell according to claim 1, wherein said divalent silver oxide and amorphous activated carbon are mixed uniformly, and the amount of said amorphous carbon is less than two weight percent of said silver oxide.

3. The silver oxide cell according to claim 1, wherein said amorphous activated carbon is one or more amorphous carbons selected from the group consisting of activated carbon, charcoal, carbon black or cokes.

4. The silver oxide cell according to claim 1, wherein said current collector comprises an alkali-resistant electrolyte-inert conductive metal net within the body of said positive acting material.

5. The silver oxide cell according to claim 1, wherein the quantity of activated carbon is the range from 0.5–2.0 weight percent against said divalent silver oxide, and the electrolyte essentially consists of an aqueous solution of 30–40 weight percent of sodium hydroxide or potassium hydroxide, saturated with zinc oxide, and the negative-active material is zinc, amalgamated with ten weight percent of mercury.

6. The silver oxide cell according to claim 1, wherein said current collector comprises a pair of conductive plates having a plurality of conductive pins penetrating into the body of said positive-active material.

7. The silver oxide cell according to claim 1, wherein said current collector comprises a plurality of conductive plates which are conductively fastened to and raised from the bottom of the cathode can into the body of said positive-active material.

* * * * *